United States Patent
Campbell et al.

[11] Patent Number: 5,976,384
[45] Date of Patent: Nov. 2, 1999

[54] PROCESS FOR TREATING WASTE WATER

[76] Inventors: Bryan A. Campbell, 2920 NE. 23rd Pl., Pompano Beach, Fla. 33062; Jerry D. Ennis, 1890 SW. 70th Ave., Plantation, Fla. 33317

[21] Appl. No.: 09/066,136

[22] Filed: Apr. 24, 1998

Related U.S. Application Data

[60] Provisional application No. 60/045,039, Apr. 28, 1997.

[51] Int. Cl.$^6$ .................................................. C02F 1/72
[52] U.S. Cl. .......................... 210/752; 210/755; 210/758; 210/760; 210/764; 422/30; 422/37
[58] Field of Search .................... 210/752, 754, 210/755, 758, 760, 764; 422/28, 30, 37

[56] References Cited

U.S. PATENT DOCUMENTS

| | | | |
|---|---|---|---|
| 3,899,423 | 8/1975 | McGrath | 210/152 |
| 4,188,289 | 2/1980 | Besik | 210/7 |
| 4,204,955 | 5/1980 | Armstrong | 210/61 |
| 4,311,598 | 1/1982 | Varachtert | 210/757 |
| 4,370,306 | 1/1983 | Kirchner et al. | 423/220 |
| 4,416,786 | 11/1983 | Knorre et al. | 210/746 |
| 4,612,124 | 9/1986 | Escrig | 210/721 |
| 5,037,624 | 8/1991 | Tom et al. | 423/210 |
| 5,132,383 | 7/1992 | Larson et al. | 526/292.2 |
| 5,167,806 | 12/1992 | Wang et al. | 210/188 |
| 5,240,600 | 8/1993 | Wang et al. | 210/188 |
| 5,306,432 | 4/1994 | Puetz | 210/759 |
| 5,433,858 | 7/1995 | Elliott, Jr. | 210/651 |
| 5,470,480 | 11/1995 | Gray et al. | 210/632 |
| 5,503,720 | 4/1996 | Teske | 205/787 |
| 5,611,938 | 3/1997 | Smolik et al. | 210/755 |

*Primary Examiner*—Jay H. Woo
*Assistant Examiner*—Betsey J. Morrison
*Attorney, Agent, or Firm*—Head, Johnson & Kachigian

[57] ABSTRACT

A process for treating bacteria laden effluent from a sewage treatment digester to condition the effluent for release into the environment includes the steps of thoroughly mixing the effluent with a bactericide, conveying the mixed effluent to a reaction zone to completely kill any bacteria entrained in the waste water to provide a substantially bacteria free effluent, mixing an oxidant with the bacteria free effluent, maintaining the mixture for a sufficient time to permit substantially complete oxidation and neutralization of entrained bactericide, and discharging the treated effluent into the environment. In an alternative procedure the treated effluent is passed through a neutralizing filtration step to neutralize any active bactericide before the effluent is discharged to the environment.

12 Claims, 1 Drawing Sheet

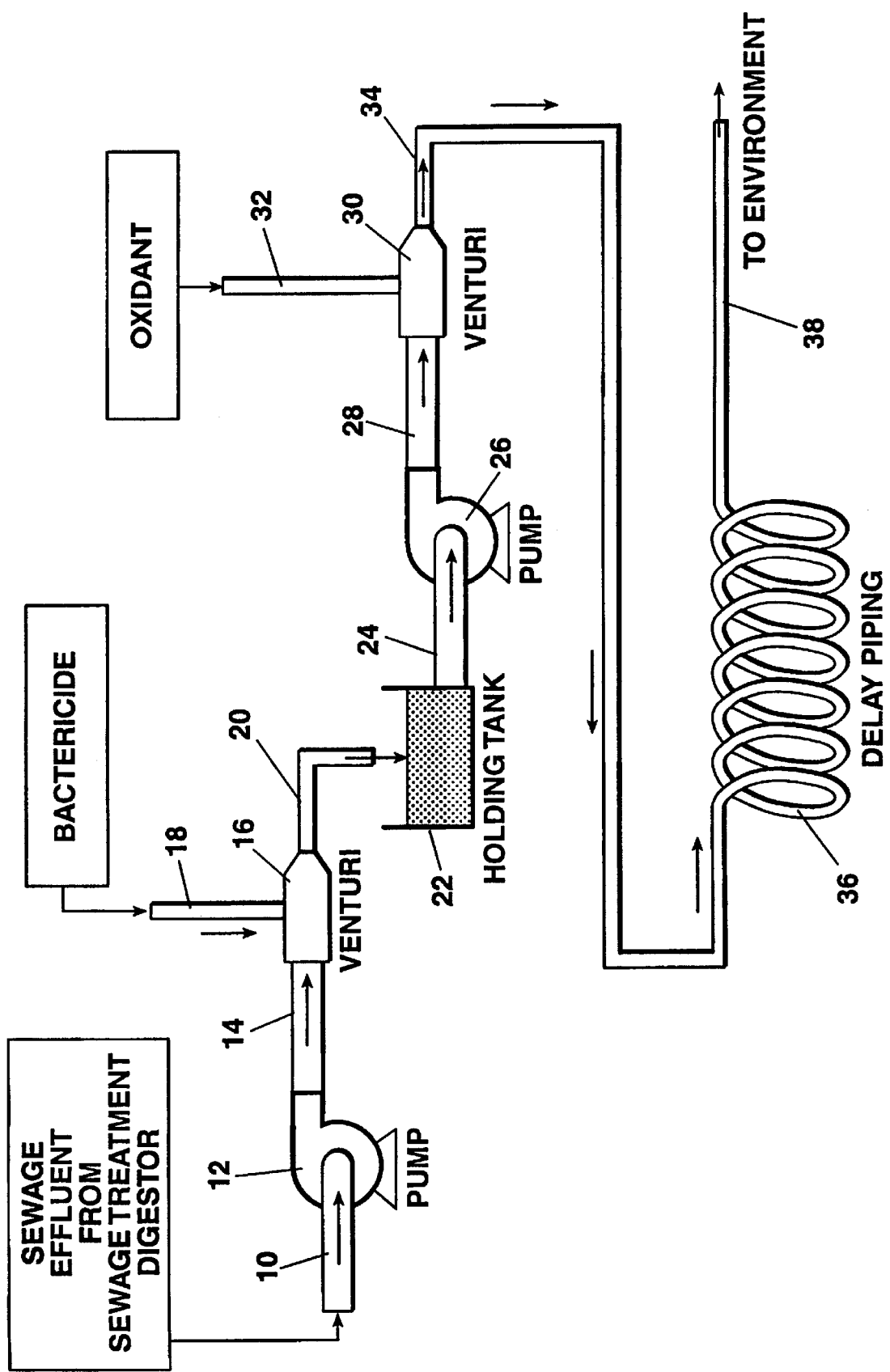

PROCESS FOR TREATING WASTE WATER

REFERENCE TO PENDING APPLICATIONS

This application claims the benefit of and incorporates by reference prior filed Provisional Application No. 60/045,039 filed Apr. 28, 1997 entitled "Process For Treating Waste Water".

REFERENCE TO MICROFICHE APPENDIX

This application is not referenced in any microfiche appendix.

BACKGROUND OF THE INVENTION

A serious problem all over the world is handling waste water resulting from sewage treatment facilities. Cities are becoming larger and larger and accordingly are generating increasing quantities of sewage waste water that must be properly treated before it is released to the environment. A standard technique for treating municipal sewage is to pass the sewage into a digester system wherein the sewage is reacted with bacteria to break down the organic components. After complete reaction with bacteria the result under ideal condition is a relatively clear effluent, the non-digestible components such as dirt, sand and so forth settling out as sludge that is permitted to dry and then disposed of. Such sludge makes good landfill and is otherwise readily disposed of.

A more serious problem is disposition of the resultant water effluent after treatment in a digester. While the organic action in a digester usually results in substantially complete decomposition of organic matter, nevertheless the resultant effluent can contain bacteria that can be harmful to aquatic life as well as animals and humans. Standard procedures for treating municipal waste in digesters frequently result in production of effluent that contains coliforms, that is, *E-coli* type bacteria that can be a serious environmental hazard.

The presently used procedure for treating the effluent from a municipal waste digester is to inject chlorine into the effluent for discharge to the environment. While chlorine is successful in killing any remaining bacteria and particularly killing coliforms, the chlorine itself is becoming an environmental problem. Because of the huge amounts of municipal waste effluent that is treated by chlorine that is constantly released to the environment, including into the atmosphere, some authorities are beginning to impose restrictions on the amount of chlorine that can be contained within discharged effluent. Putting it another way, some governmental agencies have enacted specifications defining effluent suitable for environmental discharge to substantially eliminate the use of chlorine. Most plants which put effluent back into the environment are to dechlorinate the effluent first. This doubles the cost of disinfecting the effluent and then dechlorinating.

This invention provides a method of treating sewage waste water that results from a sewage digester system to make the sewage waste water acceptable for discharge into the environment, such as a lake, stream, ocean or the like, and which does not include entrained chlorine.

Others have provided systems and processes for treating municipal waste in an effort to provide an effluent discharge that is environmentally acceptable. As an example, U.S. Pat. No. 4,188,289 that issued Feb. 12, 1980 entitled "Process For Purification Of Sanitary Water", Ferdinand Besik, inventor, teaches a relatively complex system employing a series of various biochemical and chemical reactions including the use of a fluidized reactions that take place in a fluidized non-biodegradable suspended solid solution. The system includes chemical oxidation for providing removal of remaining impurities and the killing of bacteria and viruses. However, the system involves a relatively complex sequence of steps so that the system would be inheritantly difficult to monitor and control.

U.S. Pat. No. 4,204,955 issued May 27, 1980 is entitled "System For Pollution Suppression", Edward T. Armstrong, inventor. This patent teaches a process in which air, oxygen-enriched gas, or oxygen itself is ozonated and the system operates in a way to provide increased concentration of ozone that is fed to a fluid dispersing system containing a flat plate orifice which creates a down stream vena contracta. The addition of the ozonated gas into the vena contracta produces an efficient mixing device, however the overall system is complex and the equipment required to carry out the process is therefore relatively expensive compared with the simplicity and economy of operation of the process that is to be revealed in this disclosure.

U.S. Pat. No. 4,370,306 issued Jan. 25, 1983 is entitled "Process For Separation of Traces of Gaseous Contaminants From Waste Gases By Chemical Absorption", Kurt Kirchner and Wolfgang Litzenburger, inventors. The process disclosed in this patent is useful for separation of traces of gaseous contaminants or pollutants that are based on halogens, sulfur or other compounds. The process that is taught in this patent is not helpful in finding a way to avoid the commonly employed use of chlorine to kill bacteria that is typically entrained in a sewage treatment discharge effluent and therefore does not solve the problem that is solved by the present invention.

U.S. Pat. No. 4,416,786 issued Nov. 22, 1983 is entitled "Process For The Treatment of Continuous Waste Water Streams Having Changing Contents of Different Oxidizable Materials With Hydrogen Peroxide", Helmut Knorre, Joachim Fischer and Klaus Stutzel, inventors. This patent is concerned with a process for the treatment of a continuous waste water stream having a varying content of oxidizable materials wherein the oxidizable materials are treated with hydrogen peroxide for the purpose of detoxification and reduction of the chemical oxygen demand and biological oxygen demand. This patent further includes a method of regulating the rate of administration of hydrogen peroxide. The system is relatively complex and does not achieve the economy, efficiency and simplicity of the system of this invention for treating waste water.

For additional background information relating to efforts of others to improve waste water treatment, the disclosures contained in the following United States patents are helpful.

| U.S. PAT. NO. | INVENTOR | TITLE |
| --- | --- | --- |
| 4,612,124 | Escrig | Method of Sewage Treatment |
| 5,037,624 | Tom et al | Composition, Apparatus and Process, For Sorption of Gaseous Compounds of Group II–VII Elements |
| 5,132,383 | Larson et al | Copolymers of 3-Methacryloyloxy-2-Hydroxypropyl Trimethylammonium Chloride Monomer and Vinyl Monomer |
| 5,167,806 | Wang et al | Gas Dissolving and Releasing Liquid Treatment System |
| 5,240,600 | Wang et al | Water and Wastewater Treatment System |

| U.S. PAT. NO. | INVENTOR | TITLE |
| --- | --- | --- |
| 5,433,858 | Elliott, Jr. | Treatment of Hazardous Waste Water |
| 5,470,480 | Gray et al | Process For Treating Waste Water Effluent |
| 5,503,720 | Teske | Process For The Quantitative Determination of Electrochemically Reducible or Oxidizable Substances, Particularly Peracetic Acid Mixed With Other Oxidizing Substances |

SUMMARY OF THE INVENTION

This invention provides an improved process for treating effluent from a sewage treatment digester to condition the effluent so that it can be safely released to the environment. In a digester waste is reacted with bacteria to effectively convert organic components of the waste to soluble forms. The digester typically includes an environment in which non-digestible solid components, such as dirt, sand, entrained metal, plastic and so forth, settle out and is separately removed.

The liquid effluent output of a digester typically includes some entrained bacteria that is harmful if discharged into the environment, such as *E-coli* type bacteria. In the past it has been a common procedure to treat the discharged effluent from a digester with chlorine to kill any entrained bacteria, and particularly to kill *E-coli* bacteria. While chlorine functions satisfactorily for this purpose, the chlorine itself has become an environmental detriment. The present invention provides a way of treating the effluent discharge from a digester to condition the effluent for discharge into the environment without the use of chlorine.

In the practice of the invention the effluent output of a digester is pumped through a mixing station, typically in the form of a venturi, where a bactericide is injected into and mixed with the effluent. The bactericide may be dimethyl ethelbenzyl ammonium chloride mixed with bis tributyltin. More broadly stated the bactericide may be a quaternary ammonium compound, that is, a compound containing an ion $NR_4+$ where R is an organic group or a hydrogen atom. In an even broader sense the bactericide may be a quaternary compound that has four organic radicals connected to a nitrogen atom. In some instances, mixtures of these bactericides may be employed.

The effluent having a bactericide mixed therewith is then conducted to a reaction zone, such as a holding tank, where the effluent with the bactericide admixed is held for a sufficient time to complete the destruction of any entrained bacteria. Out of the reaction zone or holding tank the effluent then is substantially bacteria free, however, it is not yet in condition for discharge to the environment since the treated effluent may entrain active bactericide. Therefore, the treated effluent is passed to a station where an oxidant is introduced into the effluent, the oxidant being in sufficient amount and concentration to oxidize any entrained bactericide. For instance, where the bactericide includes tributyltin the oxidant must convert any entrained tin to tin oxide, a compound that is not harmful to the environment or if the bactericide is an ammonium compound, the oxidant needs to reduce the bactericide to a nitrous oxide or other inert compound that will be harmless in the aqueous effluent discharge to the environment. As an alternative use of an oxidant the treated effluent in the piping can be passed through a neutralizing filtration process, such as passing the effluent through bentonite, an aluminum silicate clay containing some magnesium and iron, a product frequently used as a drilling mud additive.

If the oxidant is a gas, such as ozone, it may be injected directly into a conduit in which the effluent moves. If the oxidant is in liquid form, such as a potassium permaganate solution, it is effectively injected into the effluent utilizing a venturi. If the oxidant is replaced by a neutralizing filtration process the effluent is passed through filtration material.

Regardless of the method of injecting an oxidant sufficient time, usually only requiring a few minutes, must be allowed to complete a full reaction of the oxidant with any entrained bactericide before the effluent is in final condition for discharge into the environment. Since a relatively short delay is all that is necessary to ensure complete reaction of the oxidant, delay piping may be employed. A longer delay can be accomplished by passing the treated fluid with oxidant therein into a holding tank, although the use of a holding tank will not normally be required.

The process of this invention thus provides a system for treating the output of a sewage digester in a way to ensure that the final effluent discharge is completely safe to the environment and in a way that does not employ chlorine as has been the practice in the past.

A more complete understanding of the invention will be obtained from the following detailed description of the preferred embodiments and the drawings, taken in conjunction with the claims.

DESCRIPTION OF THE DRAWING

The drawing is a flow diagram of the basic components of a system for treating waste water effluent showing the sequence of steps employed in treating the effluent to permit discharge into the environment.

DETAILED DESCRIPTION OF THE INVENTION

The basic concepts of the invention are illustrated diagrammatically in the flow diagram. The standard technique for treating municipal waste is to convey raw waste into a digester which may be in the form of vessels made of concrete or metal or may be large earthen banked ponds. In the digester the raw sewage is subject to bacterial action. To augment bacterial action it is a common procedure to stir and aerate the sewage to accelerate bacterial decomposition of the organic content of the sewage. After decomposition the sewage is allowed to settle so that non-decomposable solid components, such as sand, dirt, entrained metals, plastic or so forth will settle out leaving a liquid effluent which, at least theoretically, is free of undigested sewage waste. This sewage waste, irrespective of the thoroughness of the digester treatment, frequently continues to carry bacteria, and particularly coliforms such as *E-coli*. Before the treated effluent can be discharged to the environment the coliform bacteria must be eliminated. In FIG. 1 conduit 10 is representative of a stream from a sewage treatment digester wherein the entrained sewage has been subject to bacterial decomposition and from which solid components have been separated by gravitational settlement and in which the effluent is essentially satisfactorily for discharge to the environment except for possible entrained bacteria.

In this system, the effluent from a digester passes by way of conduit 10 to a pump 12 with the outlet 14 of the pump passing into a first venturi 16. A feed line 18 is connected to a source of chemical treatment having the ability to eradicate all remaining bacterial content of the effluent. The bactericide that is injected from feed line 18 may be a combination of dimethyl ethelbenzyl ammonium chloride and bis tributyltin oxide or a quaternary ammonium compound. Combinations of bactericides has proven to be highly effective in eradicating bacteria, including coliforms.

It has been determined that low levels of concentration of the preferred bactericides are adequate to substantially kill bacteria in the sewage effluent. For instance, if the bactericide is a concentrated quaternary ammonium salt solution the use of 2 to 8 ml of the solution to each 250 gallons of sewage effluent is all that is normally required. This ratio is also about 2 to 8 gallons of bactericide concentrate to each 1,000,000 gallons of sewage effluent.

In an alternate method of practicing the invention the bactericide injected into the sewage effluent before the effluent is conveyed into holding tank 22 may be a quaternary ammonium compound, that is, a compound containing an ion $NR_4+$ where R is an organic group or a hydrogen atom. In a broader sense, the bactericide may be a quaternary compound, that is, a compound having four organic radicals connected to a nitrogen atom. The particular quaternary compound selected for use in practicing the invention will be determined by commercial availability, economy and bactericidal activity.

Bactericide from feed line 18 is drawn into venturi by the jet action of the venturi to cause the bactericide to thoroughly admix with the sewage effluent flowing from conduit 14. The venturi jet action achieves highly effective dispersion of the bactericide throughout the effluent and consequently very efficient bacterial kill. The mixture from the first venturi passes through conduit 20 and is deposited into a holding tank 22.

The function of holding tank 22 is to retain the effluent and bactericide in an environment for a sufficiently long time to insure complete reaction of the bactericide with the effluents so as to cause all of the entrained coliforms to be killed by the bactericide. It has been learned that the bactericide/effluent mixture should remain in the holding tank for at least about 30 minutes to insure the effective decimation of the coliforms.

The treated effluent flows from holding tank 22 through conduit 24 to a second pump 26 providing an output through conduit 28 of the treated effluent that is raised to an increased flow pressure for injection into a second venturi 30.

The effluent passing through conduit 28 is theoretically in condition to be discharged to the environment, that is, the content of conduit 28 represents effluent that has been treated in a digester for breaking down all of the organic matter originally in the sewage and the effluent has been treated to eradicate any remaining entrained bacteria, particularly any entrained coliforms, and therefore from a bacteriological standpoint, the effluent in conduit 28 is satisfactorily for discharge into the environment. However, the effluent in conduit 28 may contain unreacted bactericides, such as quaternary ammonium salts, a highly effective bactericide. To discharge the effluent containing any active bactericide to the environment may result in undesirable consequences, such as fish kills and so forth. Therefore, before the effluent from conduit 28 can be passed to the environment, substantially all of any remaining active bactericide must be neutralized. This can be achieved by the step in which an oxidant is mixed with the effluent. Another way of neutralizing bactericide is passing the treated effluent through a neutralizing filtration process, such as through a bed of bentonite clay.

One way of mixing an oxidant with the effluent is to employ a venturi 30 having connected to it a feeder line 32. The oxidant is preferably ozone or a potassium permaganate solution. Ozone, for use as an oxidant, is most effectively used as a gas from an ozone generator. Ozone gas may be injected directly into conduit 28 without using a venturi. If the oxidant is potassium permaganate the best procedure is to prepare a solution of potassium permaganate and water that is passed through feed line 32 into the venturi. In second venturi 30 the oxidant is thoroughly admixed with the effluent from conduit 28 and passes out through outlet conduit 34. The mixture in conduit 34 is the effluent having been treated with a bactericide and an oxidant, the oxidant functioning to react with and neutralize any remaining non-neutralized bactericide. As an example, when the bactericide includes tributyltin the oxidant reacts with any tin remaining in the effluent to produce harmless tin oxide.

In order to insure that the oxidation reaction is fully accomplished it is important that the effluent and oxidant remain commingled for a sufficient length of time which is not necessarily a long time; that is, it is not a time as long as is required for the bactericide action in holding tank 22, but the content of conduit 34 is not in condition to be immediately discharged to the environment. Instead, conduit 34 could be connected to a second holding tank (not shown) and from that holding tank to the environment or, another solution (illustrated) is to be sure that the length of conduit 34 before discharge into the environment is sufficiently long to provide the needed delay to achieve complete oxidation of entrained bactericide. This can be accomplished by coiled delay piping 36. The delay obtained by delay piping 36 is sufficient to completely react and oxidize entrained bactericide so that no unoxidized bactericide remains in discharge conduit 38.

The effluent in discharge conduit 38 is in condition to be discharged to the environment. By "discharged to the environment" means passing the treated effluent to a river, stream, lake, ocean or the like under conditions wherein the treated effluent is absorbed into the environment.

An important aspect to the system of this invention is that it does not use chlorine for the treatment of an effluent passing out of a sewage digester as is the practice commonly used in treating municipal waste today in many areas of the world. Chlorine has a residuary effect when used to treat municipal waste that accumulates in the environment in which the treated waste water is discharged and in some parts of the world regulations have been enacted to limit the discharge of treated waste having a residual chlorine content and in some areas to completely ban the use of chlorine. This invention eliminates the use of chlorine for treating effluent from a sewage treatment digester by providing highly effective bactericide followed by the important step of oxidizing, filtering and/or neutralizing any bactericide remaining in the treated effluent so that the discharge treated effluent does not contain any significant bacteria or active bactericide.

When the oxidant is potassium permaganate it is preferably fed as a solution through feed inlet 32 as shown in the flow diagram. If the oxidant is ozone it is fed as a gas directly into conduit 28 and venturi 30 would not be required and if the oxidation step is replaced with a neutralizing filtration step then a venturi is not employed.

The claims and the specification describe the invention presented and the terms that are employed in the claims draw their meaning from the use of such terms in the specification.

The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A process for treating bacteria laden effluent from a sewage treatment digester to condition the effluent for release into the environment, without the use of chlorine, comprising the steps of:

(1) thoroughly mixing the effluent with a bactericide wherein said bactericide is not chlorine;

(2) conveying said mixed effluent from step 1 to a reaction zone;

(3) maintaining said mixed effluent in said reaction zone for a time sufficient to at least substantially completely kill any entrained bacteria to provide a substantially bacteria free effluent;

(4) mixing an oxidant with said bacteria free effluent from step (3);

(5) maintaining the mixture obtained from step (4) for a sufficient time to permit substantially complete oxidation and neutralization of entrained bactericide; and (6) discharge the effluent from step (5) into the environment.

2. A process for treating bacteria laden effluent from a sewage disposal plant according to claim 1 wherein said bactericide employed in step (1) is a mixture of dimethyl ethelbenzyl ammonium chloride and bis tributyltin.

3. A process for treating bacteria laden effluent from a sewage disposal plant according to claim 1 wherein said bactericide employed in step (1) is a compound containing an ion $NR_4+$ where R is an organic group or a hydrogen atom.

4. A process for treating bacteria laden effluent from a sewage disposal plant according to claim 1 wherein said bactericide is a quaternary compound having four organic radicals connected to a nitrogen atom.

5. A process for treating bacteria laden effluent from a sewage disposal plant according to claim 1 wherein said bactericide is a quaternary ammonium compound.

6. A process for treating bacteria laden effluent from a sewage disposal plant according to claim 1 wherein in step (3) the mixed effluent is maintained in said reaction zone for at least about thirty minutes.

7. A process for treating bacteria laden effluent from a sewage disposal plant according to claim 1 wherein said oxidant employed in step (4) is ozone or a potassium permaganate solution.

8. A process for treating bacteria laden effluent from a sewage disposal plant according to claim 1 wherein sufficient time to permit substantially complete oxidation and neutralization of entrained bactericide in step (5) is achieved by passing the mixture from step (4) through delay piping before discharging the effluent into the environment.

9. A process for treating bacteria laden effluent from a sewage disposal plant according to claim 1 wherein step (1) is carried out using a venturi.

10. A process for treating bacteria laden effluent from a sewage disposal plant according to claim 1 wherein step (4) is carried out using a venturi.

11. A process for treating bacteria laden effluent from a sewage disposal plant according to claim 1 wherein the reaction zone employed in step (2) is a holding tank.

12. A process for treating bacteria laden effluent from a sewage disposal plant according to claim 1 wherein oxidation and neutralization of the entrained bactericide in step 5 is achieved by passing the effluent through a neutralizing filter device.

* * * * *